Figure 1:
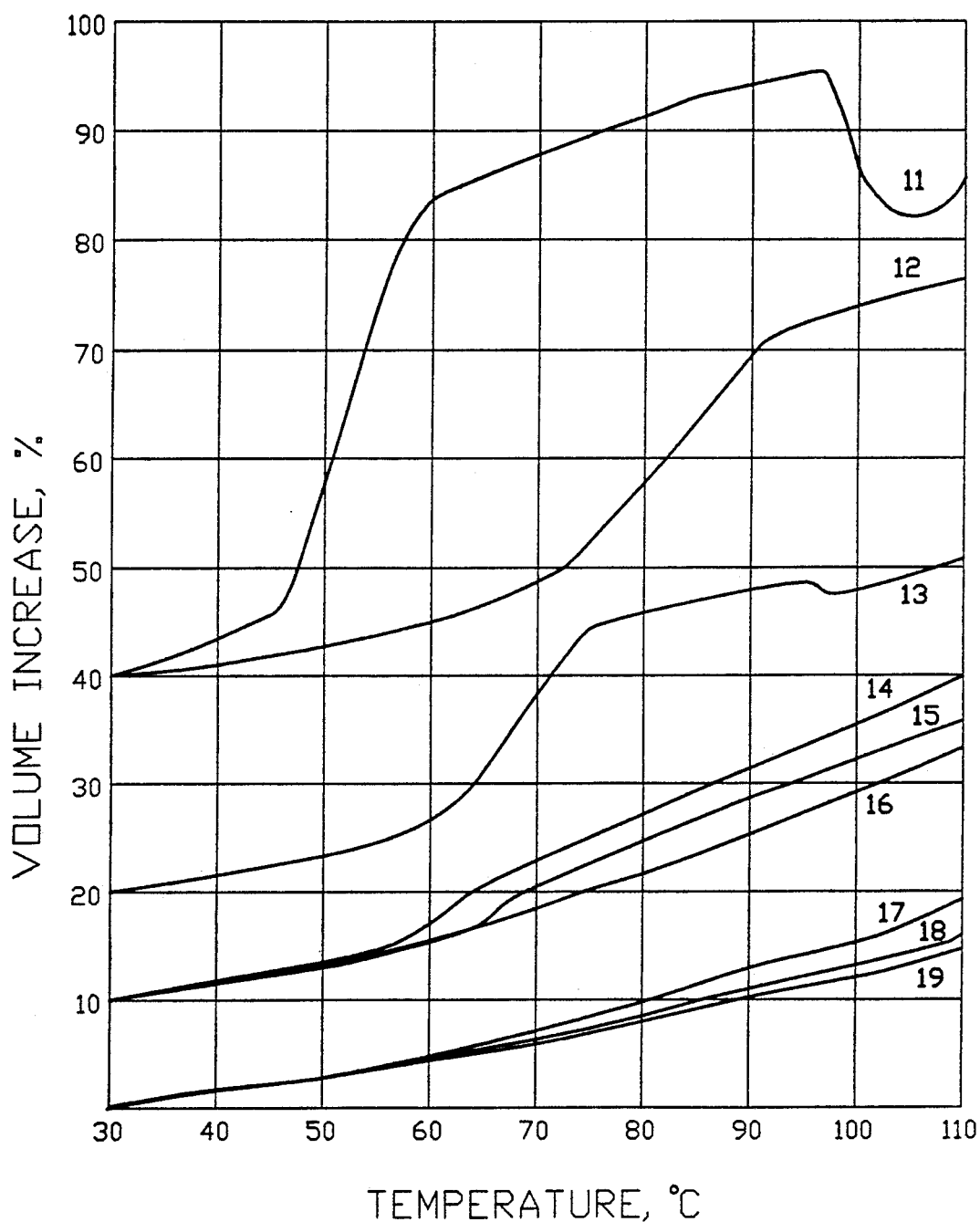

United States Patent [19]

Oberth

[11] Patent Number: 5,071,630

[45] Date of Patent: Dec. 10, 1991

[54] PHASE-STABILIZATION OF AMMONIUM NITRATE BY ZINC DIAMMINE COMPLEXES

[75] Inventor: Adolf E. Oberth, Fair Oaks, Calif.

[73] Assignee: John H. Wickman, Citrus Heights, Calif.

[21] Appl. No.: 540,590

[22] Filed: Jun. 20, 1990

[51] Int. Cl.$^5$ ............................................... C01C 1/18
[52] U.S. Cl. .................................... 423/266; 423/396
[58] Field of Search .............................. 423/266, 396

[56] References Cited

FOREIGN PATENT DOCUMENTS 2125755 12/1972 Fed. Rep. of Germany ...... 423/273

Primary Examiner—Wayne A. Langel

[57] ABSTRACT

A phase-stable, oxidizer-grade zinc diammine complex stabilized ammonium nitrate that retains its phase-stability, has a minimum hygroscopicity and cure interference, is prepared by dissolving an anhydrous zinc diammine complex, which may be either the sulfate, perchlorate or nitrate, in dry molten ammonium nitrate. The complex is best prepared in a separate step by melting a 3/1 molar mixture of ammonium nitrate with zinc oxide which produces the zinc diammine dinitrate complex contaminated with the water of the reaction. The melt is dried by driving off the water. First by simple boiling, and the final traces by means of purging with dry air or nitrogen gas. The ammonia lost in this drying operation is exactly replenished by purging with anhydrous ammonia gas. The sulfate complex is obtained by co-dissolving an essentially stoichiometric quantity of ammonium sulfate in either the melt of the complex or the bulk of the molten ammonium nitrate. The perchlorate complex is prepared similarly by co-dissolving a stoichiometric quantity of ammonium perchlorate in the molten ammonium nitrate.

6 Claims, 2 Drawing Sheets

PHASE-STABILIZATION OF AMMONIUM NITRATE BY ZINC DIAMMINE COMPLEXES

BACKGROUND-FIELD OF INVENTION

The field of the present invention pertains to an improved method to phase-stabilize ammonium nitrate by zinc diammine complexes for use as solid propellant oxidizer.

BACKGROUND-DESCRIPTION OF PRIOR ART

The present trend in solid propellants for large booster rockets is towards "clean" propellants, i.e. propellants whose combustion products are non-polluting. Ammonium nitrate (AN) would be an ideal oxidizer, as its combustion products are harmless nitrogen and water. Other advantages are low cost and practically unlimited availability.

A stumbling block for the application of AN as solid propellant oxidizer has been it polymorphism, of which the crystal-phase change between phase IV and phase III at 32° C. is of particular significance, since this temperature regime is often encountered during normal storage. Transition through this temperature causes the destruction of the AN-crystal which results in the increase of volume and concomitant porosity of the propellant grain, as a result of the non-alignment of the crystallographic axes of the micro-crystallites in the AN particles undergoing recrystallization.

A large number of compounds or combinations of compounds have been claimed as phase stabilizers, but of these only the incorporation of potassium, nickel- and zinc-compounds into ammonium nitrate has provided adequate phase-stability for use as solid propellant oxidizer. Unfortunately, it requires about 15% KNO$_3$ for adequate stabilization, which not only greatly reduces the specific impulse, but also puts basic (and toxic) K-oxides and carbonates into the exhaust. The problem of Ni-stabilized AN is primarily the inherent toxicity of nickel-oxides in the exhaust, so that little, if anything at all, would be gained with respect to pollution, if a K-, or Ni-stabilized AN (PSAN) were to replace the presently used ammonium perchlorate oxidizer. On the other hand, zinc stabilizers yield harmless zinc oxide during combustion. Furthermore, since as little as the equivalent of 1.5% ZnO suffices for adequate phase-stability, pollution is minimized. The reason why zinc phase-stabilized ammonium nitrate (Zn-PSAN) has not been used so far is that present methods of fabricating Zn-PSAN yield a product whose phase-stability declines rapidly on storage. Also, such Zn-PSAN has a strong catalytic effect on the polyurethane cure-reaction causing propellant processing problems, as well as an increased hygroscopicity with concomitant adverse effects on shelf-life and other properties.

The conventional method of fabrication of Zn-PSANs, as practiced before and taught by the Canadian Patent #879586 (1971), consists of dissolving zinc oxide in molten ammonium nitrate whereby mostly the following reaction occurs:

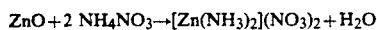

$$ZnO + 2\ NH_4NO_3 \rightarrow [Zn(NH_3)_2](NO_3)_2 + H_2O$$

The reaction is very rapid at the melt temperature and is essentially complete as soon as the ZnO has been added. The resulting zinc diammine nitrate dissolves in the AN and is the effective stabilizer. Other anions, notably the sulfate in the form of ammonium sulfate, may be co-dissolved to modify properties of the PSAN. The melt may then be prilled, grained or in other ways converted into particulate matter. However, Zn-PSANs obtained in this way lose phase-stability, are usually quite hygroscopic and present pot-life problems, as mentioned above. Table I and II show the poorer quality of such PSANs.

OBJECTS AND ADVANTAGES

The chief object of the present invention is to provide a method to produce a Zn-PSAN which will retain its phase stability. A further object of the invention is to provide a Zn-PSAN that does not cause pot-life problems in polyurethane propellants. A still further object is to provide a Zn-PSAN with minimized hygroscopicity.

SUMMARY OF THE INVENTION

It has now been found according to the present invention that he cause of the above problems are too high levels of moisture contamination, and/or too much loss of ammonia of the Zn-PSAN, when produced by state of the art processes. The reasons are that every percent zinc oxide reacting with the AN generates 0.22% water which is essentially retained in the PSAN, unless a high temperature step is added, e.g. heating to above 220° C. to boil off most of the water, and/or drying at a later stage. But unfortunately, either excessive heating or forced-air drying of granulated Zn-PSAN is of dubious utility, since zinc diammine complexes easily lose ammonia, thereby forming anhydrous, non-amminated, very hygroscopic zinc nitrate which is responsible for the undesirable cure-catalysis of the PSAN, as well as its increased hygroscopicity.

The slowly occurring loss of phase-stability in wet PSANs is caused by hydrolysis of the zinc diammine complex into a basic, AN-insoluble, inactive hydroxyl compound. This reaction occurs at temperatures below about 60° C. Heating of such deteriorated PSAN above 60° C. reverses the reaction (providing none of the evolved NH$_3$ was allowed to escape) thereby restoring phase-stability. This is most likely the reason why the loss of phase-stability was not detected earlier, since most stability (quality) tests consist of measuring the volume increase that PSANs suffer as a result of repeated temperature cycling through the transition region, typically form $-20°$ to $+70°$ C. If the higher temperature extreme is chosen low enough, so that the reversal reaction does not occur, phase-stability is not restored. Table II shows some pertinent tests of that kind. The rate of restoration of the zinc-complex increases with temperature. It takes days at 60° C., less than 8 hours at 70° C. and only a few minutes at 110° C. to restore the activity of the stabilizer. Obviously, this kind of restoration of phase-stability is of little practical value, since solid propellants are customarily stored at temperatures around 25° C., and any passage through the transition temperature regime (32° C.) causes some volume increase and, therefore, damages the propellant grain. The reactions occurring may be presented in simplified form by the equation shown below:

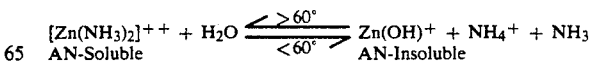

$$[Zn(NH_3)_2]^{++} + H_2O \underset{<60°}{\overset{>60°}{\rightleftarrows}} Zn(OH)^+ + NH_4^+ + NH_3$$
AN-Soluble ⇌ AN-Insoluble This effect of moisture was not obvious. In fact, previous researchers pointed out that zinc and other stabilizers provided satisfactory phase-stability even at large levels of moisture contamination (e.g. Canadian patent #879586), the slowly occurring deterioration of phase-stability escaped their notice. Table II and FIG. 1 corroborate this by showing the freshly prepared "wet" PSANs, made according to the conventional process, hardly differ in phase-stability from their dry counterparts, only after some (months) storage at room temperature does the effect of moisture contamination become apparent.

All of the above mentioned problems are avoided or substantially reduced if the Zn-PSAN is produced such that its moisture contamination is kept at a minimum and the level of ammonia is adjusted to correspond to that of the diammine complex. Obviously, there are various ways to achieve this end. The preferred method at present is to separate the fabrication of Zn-PSAN into two steps, referred to "new process". It was chosen primarily because it does not require an extensive modification of contemporary AN-production facilities.

New Process

The diammine complex is prepared separately such that it is obtained in a dry form and with the theoretically required $NH_3$-level. Again, there are many ways to accomplish this, but perhaps the least expensive and most convenient way is as follows: A 3/1 molar mixture of ammonium nitrate and zinc oxide is heated in an open vessel (preferably stainless steel or aluminum) to about 190° C. The excess AN is used to lower the melting point of the product to about 183° C. The melting point may be further lowered by a yet greater excess of AN. For example, an additive prepared from a 4/1 molar mixture melts at 153° C. The lower the melting point of the additive, the easier it is to incorporate into the bulk of the AN, the trade off being the larger volumes of additive that must be handled.

Conversion to the zinc diammine nitrate starts well below the melting point of AN, and a water-clear melt is obtained at around 160°–170° C. As this melt has a relatively high water content (>5.6%), most of the water generated in the reaction (about 80%) boils off within about 10 minutes at 190° C. The remaining water is best removed by purging the melt with either dry nitrogen or air. About 10 to 15 minutes suffice to bring the concentration of water in the additive to about 0.1%. This is an acceptable level of moisture contamination. To replenish the $NH_3$ lost during the drying stage, dry ammonia gas is then bubbled into the melt of the additive. Practice has shown that an ammonia content of about 102% (with respect to that of the diammine complex = 100%) is optimal, as about 1 to 2% of ammonia will be lost when incorporating the additive into the bulk of the ammonium nitrate and in subsequent granulation stages. As much as 200% $NH_3$ can be absorbed by the zinc cation in the melt (corresponding to the tetrammine complex), but we found that an excess over 100% increases hygroscopicity and impairs phase-stability of the PSAN (see curve 13, FIG. 1). The $NH_3$-content is easily assessed by acidimetry.

The additive, prepared as described above, is then combined with the bulk of the dry, molten AN at the relatively low temperature of 170° to 175° C., where only little loss of $NH_3$ occurs. At this stage other ammonium salts, notably ammonium sulfate or perchlorate, may be co-dissolved in the bulk-AN, in order to modify certain properties of the PSAN as will be elaborated further below. Their quantity is not critical, but typically, is enough to form the counterion of the $[Zn(NH_3)_2]^{++}$ cation. Larger amounts of sulfate reduce specific impulse, while ammonium perchlorate, of course, introduces pollution through HCl emission. The ammonium sulfate can also be dissolved in the melt of the zinc diammine complex, which usually is the nitrate.

The concentration of stabilizer, expressed in terms of the zinc metal ion concentration, to effect adequate phase stability are for the:

zinc diammine nitrate: from 1.8 to 4%, preferred about 2.5% zinc diammine perchlorate: from 1.4 to 2.4%, preferred 1.8%, and zinc diammine sulfate: from 1 to 2.4%, preferred about 1.5%.

The sulfate ion has the highest synergistic effect with respect to phase-stabilization, permitting the lowest concentration of metal in the PSAN to effect satisfactory stability. The perchlorate-ion also improves the efficiency of the zinc diammine cation, and moreover, is the most energetic additive of the three, entailing essentially no loss of impulse. The zinc diammine nitrate is automatically obtained when dissolving ZnO in AN, but is inferior with respect to efficiency and hygroscopicity to the perchlorate or the sulfate. Results obtained with the above three PSANs are shown in Table II, and FIGS. 1 and 2.

Obviously, there are other ways, well known to inorganic chemists, to obtain the dry anhydrous diammine complexes of zinc nitrate, sulfate and perchlorate, respectively, starting, for example, from the aquated salts, adding the required amount of aqueous ammonia, lowering the melting point by addition of AN, removing most of the water by boiling it off, drying the remainder by purging with nitrogen, and finally adjusting the ammonia content. However, all these procedures are more involved, use costlier materials, and are therefore less attractive than the one described above.

It is, of course, also possible to obtain the high quality PSAN directly by dissolving the zinc oxide in all of the AN, thoroughly drying the melt, as described above, and finally adjusting the ammonia level. However, this method would entail long holding times of large amounts of molten AN at a high temperature, as much more time is required to remove the water of the ZnO-AN reaction, since its concentration is much lower. This causes a higher loss of ammonia that must be replenished, and, last but not least, requires extensive modification of existing AN production equipment, which producers would be reluctant to implement, considering the relatively low demand for oxidizer-grade AN, as compared to fertilizer-grade AN.

Figure 2:
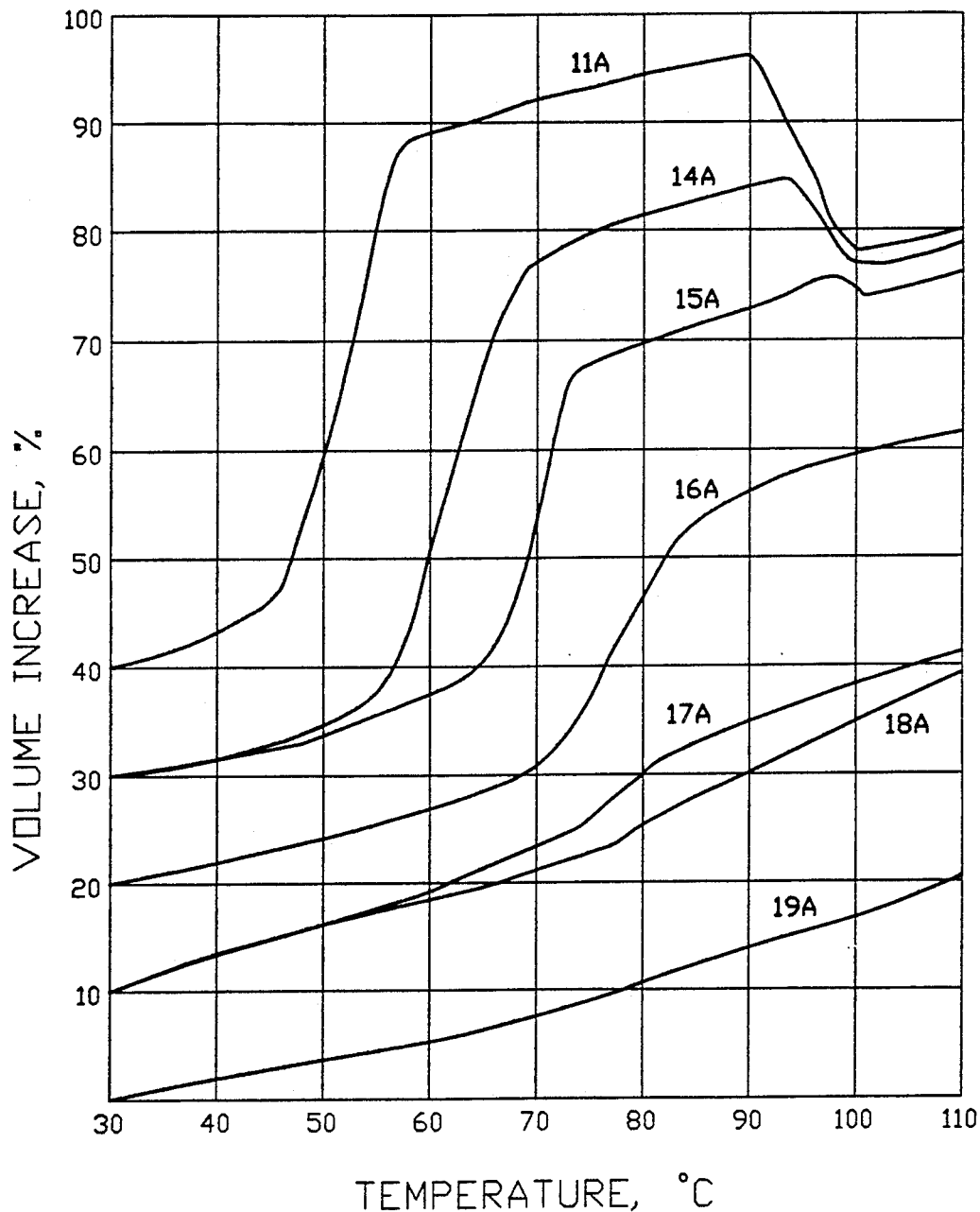

Table I and II and FIGS. 1 and 2 compare the results obtained with Zn-PSANs prepared by the new process with those from the "conventional" process, as taught by the Canadian Patent #879586.

Table I shows the effect of $NH_3$-content on hygroscopicity and catalytic activity of various Zn-PSANs. Specimen #1 is an unstabilized AN control. Specimen #2 was prepared according to the "new process", but its ammonia content was "overadjusted" to 170% of that of the diammine complex. Specimen #3 was prepared by the new process, with an $NH_3$-content corresponding to that of the diammine complex. Specimen #4 is a Zn-PSAN, obtained by the conventional process, where ZnO is dissolved in molten AN, followed by immediately by granulation. Specimens #5 and #6 were prepared similarly to specimen #4, except that they were in addition heated for 15 and 30 minutes, respectively, to 230 to 240° C. to remove the water of reaction. The data clearly shows that pot-life and hygroscopicity are least aggravated if the NH$_3$ level corresponds to that of the zinc diammine complex.

TABLE I

Effect of NH$_3$-Content on Hygroscopicity and Pot-Life of Zn(NH$_3$)$_2$(NO$_3$)$_2$-PSAN made from 3% ZnO.

| Specimen # | NH$_3$-Content, %[a] | H$_2$O absorbed at 25° C. and 50% RH, %[b] | Pot-Life at 55° C., hours[c] |
|---|---|---|---|
| 1 (Unstabil.) | none | 0.00 | 55.0 |
| 2 | 170 | 0.51 | 23.0 |
| 3 | 100 | 0.23 | 55.0 |
| 4 | 92 | 0.58 | 1.2 |
| 5 | 81 | 1.32 | 0.5 |
| 6 | 59 | 2.97 | 0.2 |

[a]Ammonia content with respect to the diammine complex = 100%.
[b]Determined by weight gain and corrected for loss of NH$_3$.
[c]The time required of a 60% slurry of PSAN to stop flowing. The liquid component of the slurry consisted of: 27.8% poly(diethyleneglycol adipate), Rucoflex S-1035, Ruco Corp.; 5.6% Desmodur N-100, Mobay Chem. Corp.; and 66.6% trimethylolethane trinitrate, Atlas Powder Co.

The quality of PSANs in the propellant industry is customarily assessed by repeated temperature-cycling propellant grains between a low and high temperature extreme, e.g. between about −20° and +70° C., and measuring the volume increase that the specimens suffered in this process. Table II shows the results obtained with various Zn-PSANs. In the test cylindrical specimens of a composite containing 70% of granulated PSAN embedded in a polybutadiene/polyurethane binder were alternatively placed for a 12 hour duration into chambers kept at the temperature extremes. The "1 year old" specimens were prepared from PSANs that had been stored for 1 year in sealed bottles in the laboratory. Table IIA lists the volume change incurred after 30 cycles from −20° to +70° C., and Table IIB those between −20° and +50° C. It is seen that the latter are more severe conditions, as the older, deteriorated Zn-PSANs, made by the conventional process, show the loss of phase-stability, which is not as obvious in the customary test. The higher +70° C. extreme restores the activity of the deteriorated Zn-PSANs during its first high temperature stay. The Zn-PSANs prepared by the new process perform well in either test.

TABLE II

Volume Increase after 30 Temperature Cycles of HTPB-Composites[a] Containing Various PSANs.

| Type of filler | Zn$^{++}$, % | Vol. Incr., % |
|---|---|---|
| (A) Cycles between −20 and +70° C. | | |
| Unstabilized, Control | none | 14.9 |
| Industrial Zn-diammine nitrate 1 yr old | 2.4 | 0.9 |
| Conv.[b] Zn-diammine nitrate, fresh | 2.4 | 0.2 |
| Same, 1 yr. old | 2.4 | 1.1 |
| Conv. Zn-diammine perchlorate, fresh | 1.6 | 0.1 |
| Same, 1 yr. old | 1.6 | 0.9 |
| Conv. Zn-diammine sulfate, fresh | 1.2 | 0.0 |
| Same, 1 yr. old | 1.2 | 5.2 |
| New p[c] Zn-diammine nitrate, fresh | 2.4 | 0.0 |
| Same, 1 yr. old | 2.4 | 0.1 |
| New p Zn-diammine sulfate, fresh | 1.2 | 0.0 |
| Same, 1 yr. old | 1.2 | 0.0 |
| (B) Cycles between −20 and +50° C. | | |
| Unstabilized AN, Control | none | 5.9 |
| Industrial Zn-diammine nitrate, 1 yr. old | 2.4 | 5.5 |
| Conv. Zn-diammine nitrate, fresh | 2.4 | 1.2 |
| Same, 1 yr. old | 2.4 | 6.0 |
| Conv. Zn-diammine sulfate, fresh | 1.2 | 0.9 |
| Same, 1 yr. old | 1.2 | 2.4 |

TABLE II-continued

Volume Increase after 30 Temperature Cycles of HTPB-Composites[a] Containing Various PSANs.

| Type of filler | Zn$^{++}$, % | Vol. Incr., % |
|---|---|---|
| New p Zn-diammine nitrate, fresh | 2.4 | 0.1 |
| Same, 1 yr. old | 2.4 | 0.1 |
| New p Zn-diammine sulfate, fresh | 1.2 | 0.0 |
| Same, 1 yr. old | 1.2 | 0.1 |
| New p Zn-diammine perchlorate, fresh | 1.6 | 0.1 |
| Same, 1 yr. old | 1.6 | 0.0 |

[a]Composition: 70% PSAN or AN dispersed in polybutadiene (R45M) 28%, cured with toluene diisocyanate (TDI) 2%.
[b]"conv." refers to "conventional" process.
[c]"new p" refers to new process.
The precision of the volume measurement is about ±0.1%.

Another method to determine phase-stability is by measuring the volumetric expansion of the PSAN as a function of temperature. FIGS. 1 and 2 show a number of such graphs. They were obtained by determining the loss of buoyancy of a specimen suspended in silicon oil that was slowly heated from room temperature to 110° C. Since the PSAN expands less than the oil when heated, there is a weight gain that is determined with an analytical balance and is converted mathematically into the corresponding volume change.

The rate of heating was 3 degrees centigrade/minute, and the samples were melt slabs, approximately ⅛ inch thick and 5.10 grams by weight. Because of the size of the specimen and the fast rate of heating there is a thermal lag resulting in a shift of the crystal-phase transitions to higher temperature. Thus, the phase IV→III transition in the controls occurs around 50° C. instead of the thermodynamic equilibrium temperature of 32.5° C. The designation zinc diammine "sulfate" or "perchlorate" means that a stoichiometric quantity of ammonium sulfate or perchlorate with respect to the Zn$^{++}$-ion concentration was co-dissolved in the AN.

DRAWING FIGURES

FIG. 1 shows the volume change vs. temperature of various PSANs tested within a few days of their preparation. For the sake of clarity and to avoid overlapping, the curves are shifted vertically, but are all drawn to the same scale, where the distance between two horizontal lines corresponds to 1 volume percent.

Reference Numerals in FIG. 1:

11 "as received", unstabilized AN from Atlas Powder Co.
12 commercial NiO-PSAN from West-Germany, containing 2.4% Ni.
13 zinc ammine dinitrate stabilized AN; 2.4% Zn; containing 90% excess ammonia over the level of the diammine.
14 zinc diammine dinitrate stabilized AN; 2.4% ZnO; H$_2$O=0.51% made by conventional process.
15 zinc diammine perchlorate stabilized AN; 1.6% Zn; H$_2$O=0.39%; conventional process.
16 zinc diammine sulfate stabilized AN; 1.2% Zn; H$_2$O=0.29%; conventional process.
17 zinc diammine nitrate stabilized AN; 2.4% Zn; H$_2$O=0.039%; new process.
18 zinc diammine perchlorate stabilized AN; 1.6% Zn; H$_2$O=0.034%; new process.
19 zinc diammine sulfate stabilized AN; 1.2% Zn; H$_2$O=0.038%; new process.

FIG. 2 presents the same plots of the same PSANs after about 16 months aging in closed bottles in the laboratory. The numerals refer to the same specimens shown in FIG. 1. The suffix "A" means that the specimen was aged.

In FIG. 1, curve 11 clearly shows the phase IV→III transition of the unstabilized AN, occurring here around 50° C., caused by thermal lag, because of the chosen test conditions. This transition is followed by the phase III→II change around 95° C. The latter manifests itself in a reduction of volume, as $AN_{II}$ is denser than $AN_{III}$. Presence of the phase III→II transition is an indicator whether the discontinuity observed at the lower temperature belongs to the disastrous phase IV-→III transition or the non-destructive direct phase IV→II transition. In curve 12, showing a commercial Ni-stabilized PSAN, this latter transition is missing, indicating that the steep increase of volume around 80° C. is due to the non-destructive phase IV→II transition. Curve 13 shows the impairment of phase-stability by too high an ammonia content, corresponding almost to that of the zinc tetrammine complex. Curve 14, 15 and 16 are the zinc diammine nitrate, perchlorate and sulfate stabilized ANs, respectively, made by the conventional process, i.e., all have rather high levels of moisture contamination. Curves 17, 18 and 19 are the same type of PSANs made according to this invention by the new process. While the phase-stabilizing efficiency is obviously better by the new process PSANs, this difference is not too drastic, as long as the PSANs have not been aged. However, there is a significant difference in the aged PSANs, as shown in FIG. 2 when comparing curves 14A, 15A and 16A, respectively, with curves 17A, 18A and 19A, respectively. Phase-stability in the "wet" PSANs 14A and 15A is essentially gone, that of 16A is strongly impaired, while the PSANs made by the new process are still effective, showing essentially only normal thermal expansion without evidence of phase-transition.

All data presented show rather conclusively that PSANs prepared according to this invention have a better phase stability and a lower hygroscopicity and interference of the polyurethane cure-reaction.

Obviously, numerous modifications and variations of the present invention are possible in the light of the above teachings. It is therefore to be understood that within the scope of the appended claims the invention may be practiced otherwise than as specifically described herein.

I claim:
1. A method of preparing zinc-phase-stabilized ammonium nitrate having an improved retention of phase-stability, reduced hygroscopicity, and minimal cure interference in polyurethane cure-systems, consisting of
   a) reacting zinc oxide by co-melting it with 3 to 4 times the molar quantity of ammonium nitrate,
   b) removing the water generated in said reaction by purging the melt with dry inert gas, followed by
   c) adjusting the ammonia content of the melt to 200 to 204 mole per cent with respect to the applied zinc oxide by passing dry ammonia gas into said melt, and
   d) dissolving said melt in dry, molten ammonium nitrate to give a zinc metal concentration of 1 to 4 per cent, followed by
   e) solidification and granulation of the product.

2. The method of claim 1, where 0.5 to 1.5 times the molar quantity of ammonium sulfate per mol zinc oxide is added to said mixture of ammonium nitrate and zinc oxide.

3. The method of claim 2, where 1 to 3 times the molar quantity of ammonium perchlorate per mole zinc oxide replaces the ammonium sulfate.

4. A process of making zinc-phase-stabilized ammonium nitrate having an improved retention of phase-stability, reduced hygroscopicity, and minimal cure interference in polyurethane cure-systems, comprising the steps of:
   a) Dissolving 1.5 to 5 per cent zinc oxide in molten ammonium nitrate, and
   b) removing the water of reaction plus additional moisture that may be present in the ammonium nitrate melt by purging with an inert gas, folowed by
   c) adjusting the ammonia level in said melt with anhydrous, ammonia gas to 2.0 to 2.04 times the molar quantity of the applied zinc oxide, and
   d) converting said melt into a solid, granular product.

5. A method according to claim 4, wherein an additional 0.5 to 1.5 times the molar quantity of ammonium sulfate per mol of the applied zinc oxide is co-dissolved in said melt.

6. A method according to claim 5, where the ammonium sulfate is replaced by 1 to 3 times the molar quantity of ammonium perchlorate per mol zinc oxide.

* * * * *